United States Patent Office 3,468,235
Patented Sept. 23, 1969

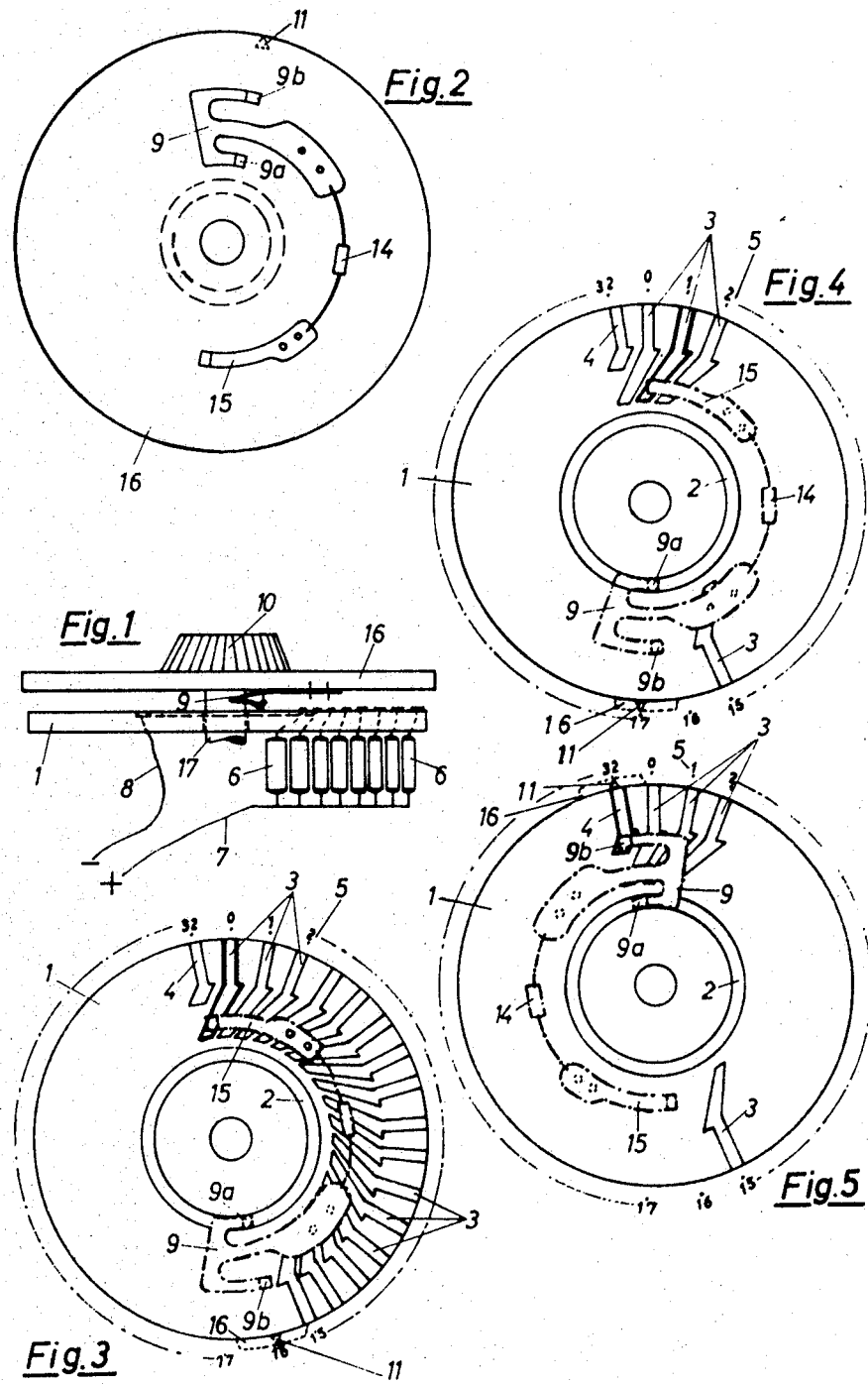

3,468,235
TIMING DEVICE FOR SETTING THE EXPOSURE TIME FOR A PHOTOGRAPHIC CAMERA EQUIPPED WITH AN ELECTRONIC TIMING DEVICE
Dieter Rittman, Calmbach, Germany, assignor to Prontor-Werk Alfred Gauthier, G.m.b.H., Calmbach, Black Forest, Germany, a corporation of Germany
Filed May 8, 1967, Ser. No. 636,935
Claims priority, application Germany, May 14, 1966, P 39,450
Int. Cl. G03b 9/58
U.S. Cl. 95—53                                      8 Claims

ABSTRACT OF THE DISCLOSURE

A timing device for setting the exposure time for a photographic camera with an electronic timing device. The timing device has a plurality of contact plates and a plurality of gradated time regulating resistors connected to the contact plates. A conductive slide path is provided which is connectable to the electronic timing device of the camera by means of a cable. A contact bridge provided which is movable to scan the contact plates and the slide path. The contact bridge is mounted on a time setter for engagement of the contact bridge with one of the cnotact plates in order too include in the circuit of the electronic timing device of the camera the respective regulating resistor corresponding to the set time. Further, a series resistor is provided which is connectable in series to the regulating resistor. Finally, the timing device has a slide contact which is connected to the series resistor and is movable synchronously with the contact bridge for engagement with one of the contact plates to connect the series resistor in series with the regulating resistors.

This invention relates to a timing device for setting the exposure time for a photographic camera with an electronic timing device and has several contact plates with attached time regulating resistors gradated with respect to their resistance value. In addition, the timing device has a slide path located in the circuit of the electronic timing device, and a contact bridge which scans the contact plates as well as the slide path. A time setter moves the contact bridge through which the respective regulating resistor corresponding to the set time value can be included in the circuit of the timing device of the camera.

Previously, in devices for setting exposure times, not settable at the camera itself, for the electronic timing device at the camera side, it has been necessary to assign a time regulating resistor for every settable exposure time value. This arrangement is disadvantageous for the reason that it requires considerable space and, in addition, burdens the instrument unnecessarily not only as far as cost but also as far as weight is concerned.

It is an object of this invention to provide a timing device for setting the exposure time for a photographic camera equipped with an electronic timing device wherein the exposure times are settable with a certain number of regulating resistors for which time values almost twice the number of regulating resistors was required in the past.

This invention provides in essence that a series resistor be addable in series to regulating resistors by means of an additional slide contact movable synchronously with a contact bridge. This design meets the practical requirements fully and is extremely advantageous because it makes possible not only the avoidance of unnecessary costs but, beyond this, the realization of a considerable saving in space requirement as well as a significant weight reduction of the arrangement.

To make the selectable time values within the exposure time range at the same setting intervals, the positioning of the additional slide contact relative to the contact bridge is expediently such, according to the invention, that the slide contact makes contact with the first contact plate arranged in series when the contact bridge has left the last of the contact plates. This makes it possible, in advantageous further development of the invention, to attain an evenly gradated series of exposure times over the entire range of settings if the resistance value of the series resistor is so chosen that, by adding it, a continuously progressing series of resistance values is achievable.

Another advantageous arrangement is finally seen by providing a pivoted time setter whereon the contact bridge and the additional slide contact are arranged so as to oppose each other with respect to the axis of rotation of the time setter. This provision coupled with relatively simple design ensures functionally safe operation fo the device.

Various other objects, features and advantages of this invention will be apparent from the following specification, claims and the drawing appended hereto wherein:

FIGURE 1 is a fragmentary side view of the timing device of this invention for providing time regulating resistors in the circuit of an electronic timing device of a photographic camera.

FIGURE 2 is a bottom view of the actuating part of the timing device of FIGURE 1 illustrating this part carrying the contact bridge and the additional contact slide.

FIGURE 3 is a top view of the conductor plate of the timing device of FIGURE 1 illustrating the contact plates and a slide path with contact bridge and slide shown in phantom line to illustrate their relative position.

FIGURES 4 and 5 are partial views similar to FIGURE 3 with the contact bridge and contact slide illustrated in phantom line in different settings.

Referring now to the drawing, there is illustrated a disk shape conductor plate, designated by the reference numeral 1, having a concentric slide path 2 thereon. The conductor plate 1 is further provided with a number of juxtaposed, essentially radially oriented contact plates 3 which are positioned adjacent to the slide path 2. In addition, the conductor plate 1 also has a contact plate 4 spaced a greater radial distance from the slide path 2 than the contact plates 3. The plate 1 may be of a printed circuit design, whereby the slide path 2 as well as the contact plates 3 and 4 are formed of a metallic material and are printed on the electrically nonconductive plate 1.

The conductor plate 1 in the disclosed embodiment forms part of an instrument not detailed in the drawing which is attachable, for example, to a known photographic camera equipped with an electronic timing device, in order to provide exposure times not settable at the camera itself. Therefore, this instrument can only have time regulating resistors correlated to a certain number of exposure times, which time regulating resistors, after connection of the instrument to the camera by means of a connecting cable, take the place of the time regulating resistors included in the circuit of the electronic timing device on the camera side.

As is further evident from the drawing, an evenly divided exposure time scale 5 spanning, for example, a time range from "0" to "32" seconds is arranged around the conductor plate 1. Thereby, the last mentioned time value is opposite the contact plate 4 while the values "0" to "15" are assigned to the contact plates 3. The contact plates 3 and 4 opposing the settling values "1" to "15" as well as "32" are each electrically connected to a time regulating resistor 6 which is tuned with regard to its resistance value to the respective time value. The resistors 6, in turn, are connected to a busbar 7 and the contact plate 3 assigned to the "0" setting has a direct connection to busbar 7, avoiding the interposition of a resistor.

After attachment of the instrument to the camera, the slide path 2 is included in the circuit of the electronic timing device via a cable 8. To include a time regulating resistor 6 corresponding to a certain exposure time value in the circuit of the electronic timing device a contact bridge 9 is provided which can be actuated by means of a time setter 10 designed, for example, as turning knob. While an arm 9a of the contact bridge 9 is in constant contact with the slide path 2, an arm 9b is so arranged that it can be brought into contact making position with the contact plates 3 as well as the shorter contact plate 4. To set the exposure time, a setting mark 11 cooperating with the exposure time scale 5 is assigned to the turning knob 10.

As already indicated, a time regulating resistor 6 is assigned to a part of the values of scale 5. To obtain the exposure times corresponding to the "16" to "31" range of the scale a series resistor 14 is provided which, when setting time values within that range, can be put in series with one of the contact plates 3 and also when provided with one of the time regulating resistors 6 connected to them. For this purpose, one side of the series resistor 14 is connected to an additional slide contact 15, movable synchronously with the contact bridge 9 and capable of making contact with the contact plates 3 only. The other side of the series resistor 14 is connected to the slide path 2 via the contact bridge 9. The expedient correlation of the additional slide contact 15 to the contact bridge 9 is such that when the contact bridge 9 has left the last contact plate assigned to the scale value "15" and the mark 11 has reached the value "16," the slide contact 15 engages the first contact plate 3 opposite the "0" setting, thus including the series resistor 14 in the circuit. The series resistor 14 has a resistance value by means of which an exposure time is obtainable which corresponds to a step following step "15" so that in the range from "16" to "31" a continuously progressing number of resistance values is includable and are formed by series resistor 14 and one of the time regulating resistors 6 connected to the contact plates 3.

To set the respective resistance value, the contact bridge 9 and the slide contact 15 are disposed, for example, on an actuating part 16 which may be designed as a circular disk and bear the setting mark 11 and have a turning knob 10. The actuating part 16 can be fixed to a shaft 17 pivoted in the housing.

After attachment of the instrument to the camera, when setting an exposure time in the range of time values "1" to "15," one of the time regulating resistors 6 is included in the circuit of the electronic timing device because arm 9b of contact bridge 9 makes contact with the respective contact plate 3. Accordingly, the slide contact 15 is disengaged so that the current can flow from the busbar 7 through the respective time regulating resistor 6, through the contact plate 3 connected to it and the contact bridge 9 as well as the slide path 2 into cable 8. During the transition to step "16," the slide contact 15, as may be seen from FIGURE 3, makes contact with the contact plate 3 assigned to the "0" setting, while arm 9b of the contact bridge 9 leaves the last contact plate 3. Therefore, the current travels from the busbar 7 directly to the contact plate 3 corresponding to the "0" setting and continues via the slide contact 15, the series resistor 14 and arm 9a of the contact bridge 9 to the slide path 2.

When setting time values within the range from "17" to "31," the resistance value resulting in the desired exposure time is formed by the series resistor 14 and the respective time regulating resistor 6 which correspond to the difference between series resistance and required resistance. For example, if an exposure time of 17 seconds is selected by means of the turning knob 10, the contact bridge 9 and the slide contact 15 assume the position with respect to the conductor plate 1 shown in FIGURE 4. Thus, the resistance value required to obtain this exposure time is formed by the series resistor 14 and the time regulating resistor 6 assigned to the time value "1" so that the current flows through the time regulating resistor 6 and the series resistor 14. When setting to the exposure time value "32," the contact bridge 9 and the slide contact 15 are in the position shown in FIGURE 5, whereby the additional slide contact 15 again has left the series of contact plates 3 while the arm 9b of the contact bridge 9 has made contact with the contact plate 4. In this case, the exposure time is obtained through one single time regulating resistor 6 tuned to the desired time value.

It will be understood that the foregoing description with the details of exemplary structure is not to be construed in any way to limit the invention, but that modifications may be made thereto without departing from the scope of the invention as set forth in the following claims.

Having thus described my invention, I claim:

1. A timing device for setting the exposure time for a photographic camera with an electronic timing device comprising a plurality of contact plates; a plurality of time regulating resistors connected to said contact plates, said regulating resistors being gradated as to their resistance value; a slide path connectable to the circuit of the electronic timing device of the camera; a contact bridge movable to scan said contact plates and said slide path; a time setter movably mounting said contact bridge for engagement of said contact bridge with one of said contact plates to include in the circuit of the electronic timing device of the camera the respective regulating resistor of said plurality of time regulating resistors corresponding to the set time value; a series resistor connectable in series with said regulating resistors; and a slide contact connected to said series resistor, said slide contact being movable synchronously with said contact bridge and engageable with one of said contact plates to connect said series resistor in series with said regulating resistors.

2. The timing device of claim 1 wherein said contact plates are arranged in sequence and wherein said slide contact and said contact bridge are positioned so that said slide contact engages the first of said contact plates when said contact bridge has left the last of said contact plates.

3. The timing device according to claim 2 wherein said contact bridge and said slide contact are disposed on a pivoted time setter and are positioned on opposite sides of the axis of rotation of said time setter.

4. The timing device of claim 1, wherein said series resistor has an ohmic value so that its addition to said regulating resistors provides a continuously progressing series of resistance values.

5. A timing device for setting the exposure time for a photographic camera with an electronic timing device comprising support means; conductive slide path means on said support means, said slide path means being connectable to the circuit of the electronic timing device of the camera; a plurality of contact members on said support means; a plurality of gradated time regulating resistance means on said support means, each one of said resistance means being connected to one of said plurality of contact members; a movable time setting contact bridge means engagable with said slide path means, said contact bridge means being movable to scan said plurality of contact members and engage one of said plurality of contact members to include in the circuit of the electronic timing device of the camera the respective regulating resistance means corresponding to the set time value; a series resistor connected with said contact bridge means and connectable in series with said plurality of regulating resistance means; and a slide contact connected to said series resistor, said slide contact being movable synchronously with said contact bridge means to scan said plurality of contact members and engage one of said contact members for connecting said series resistance means in series with one of said regulating resistance means.

6. The timing device of claim 5 wherein said contact bridge means and said slide contact are mounted on an adjustable time setter for positioning said bridge means and said slide contact relative to said contact members.

7. The timing device of claim 6 wherein said time setter is rotatable and said contact bridge and said slide contact are disposed on opposite sides of the axis of rotation of said time setter, and wherein said contact members are arranged in progression so that said slide contact engages the first of said contact members when said contact bridge has left the last of said contact members.

8. The timing device of claim 5 wherein said series resistor has an ohmic value so that when connected to said regulating resistance means via said slide contact, a continuously progressing series of resistance values is provided.

References Cited

FOREIGN PATENTS 1,101,365   1/1968   Great Britain.
1,106,310   3/1968   Great Britain.

JOHN M. HORAN, Primary Examiner

L. H. McCORMICK, Jr., Assistant Examiner

U.S. Cl. X.R.

95—53.3